(12) United States Patent
Yoshioka et al.

(10) Patent No.: US 6,372,308 B1
(45) Date of Patent: Apr. 16, 2002

(54) LIQUID CRYSTAL COMPOSITION

(75) Inventors: Yasue Yoshioka; Masahiro Johno; Tomoyuki Yui; Takahiro Matsumoto, all of Katsushika-ku (JP)

(73) Assignee: Mitsubishi Gas Chemical Company INC, Tokyo (JP)

( * ) Notice: Subject to any disclaimer, the term of this patent is extended or adjusted under 35 U.S.C. 154(b) by 0 days.

(21) Appl. No.: 09/521,956

(22) Filed: Mar. 9, 2000

(30) Foreign Application Priority Data

| Jan. 28, 1999 | (JP) | 11-213645 |
|---|---|---|
| Mar. 11, 1999 | (JP) | 11-064909 |
| Mar. 16, 1999 | (JP) | 11-070885 |
| Dec. 28, 1999 | (JP) | 11-372772 |

(51) Int. Cl.$^7$ .......................... C09K 19/12; C09K 19/54
(52) U.S. Cl. ................ 428/1.1; 252/299.5; 252/299.65; 252/299.66
(58) Field of Search .................... 252/299.65, 299.66, 252/299.5; 428/1.1

(56) References Cited

U.S. PATENT DOCUMENTS

| 5,534,190 | A | * | 7/1996 | Johno et al. ............. 252/299.65 |
| 5,938,973 | A | * | 8/1999 | Motoyama et al. ....... 252/299.65 |
| 5,972,243 | A | | 10/1999 | Mine et al. ............... 252/299.65 |
| 5,976,409 | A | * | 11/1999 | Mineta et al. ............ 252/299.65 |
| 6,001,278 | A | * | 12/1999 | Matsumoto et al. ...... 252/299.65 |
| 6,002,042 | A | * | 12/1999 | Mine et al. ............... 560/66 |
| 6,197,216 | B1 | * | 3/2001 | Mine et al. ............... 252/299.65 |

FOREIGN PATENT DOCUMENTS

| EP | 0342046 | 11/1989 |
| EP | 0450595 | 10/1991 |
| EP | 0582468 | 2/1994 |
| EP | 0718274 | 6/1996 |
| EP | 0737733 | 10/1996 |
| EP | 0780456 | 6/1997 |
| EP | 0829468 | 3/1998 |
| EP | 0829526 | 3/1998 |
| EP | 0853076 | 7/1998 |
| EP | 0893429 | 1/1999 |
| JP | 5-150257 | 6/1993 |
| JP | 5-249502 | 9/1993 |
| JP | 6-95080 | 4/1994 |
| JP | 8-337555 | 12/1996 |

OTHER PUBLICATIONS

K. Nito, et al., SID '94, Preprint, p. 48–51, 1994.
H. Orihara, et al., Ferroelectrics, vol. 147, pp. 411–418 (1993).
K. Obayashi, et al., J. Physical Soc. Jap. (letters) 64:9, pp. 3188–3191 (1995).
N. Okabe, et al., J. Appl. Phys. 31:793–796 (1992).

* cited by examiner

Primary Examiner—Shean C. Wu (57) ABSTRACT

A liquid crystal composition includes (1) an anti-ferroelectric liquid crystal compound of formula (1)

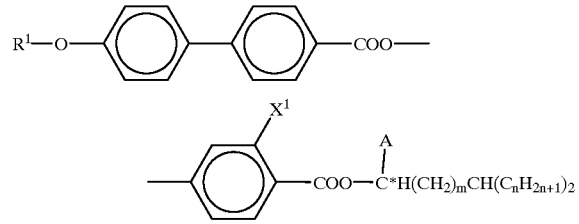

and (2) a ferrielectric liquid crystal compound or racemic compound thereof. The composition ratio of (1) to (2) is in the range extending from a value which extends from within 5 mol % of the boundary compositional ratio on the anti-ferroelectric phase side and to within 25 mol % of the boundary compositional ratio on the ferrielectric phase side. The boundary compositional ratio is obtained on the basis of a liquid crystal phase diagram prepared on the basis of conoscopic image observations obtained by changing the mixing ratio of (1) and (2). The liquid crystal composition has the following properties: (b) an optical response in a positive voltage region and a negative voltage region and free or substantially free of hysteresis; and (c) excellent alignment stability. The liquid crystal composition is substantially free from sticking, is excellent in alignment and alignment stability and exhibits a V-letter-shaped optical response so that it can be used in a highly reliable active matrix liquid crystal display device.

13 Claims, 2 Drawing Sheets

F I G. 1

F I G. 2

FIG. 3

LIQUID CRYSTAL COMPOSITION

DETAILED DESCRIPTION OF THE INVENTION

1. Field of the Invention

The present invention relates to a novel liquid crystal composition. In optical response to an applied voltage, the novel liquid crystal composition of the present invention exhibits an optical response (V-letter-shaped optical response) which is symmetrical in a positive voltage region and a negative voltage region and which involves a small hysteresis or is free of hysteresis. Further, the liquid crystal composition of the present invention is excellent in alignment and alignment stability. The liquid crystal composition of the present invention can materialize an active matrix liquid crystal display device having high display qualities and high display reliability.

2. Prior Art of the Invention

A liquid crystal display device (LCD) has been widely used as a flat panel display and is taking the place of a conventional Braun tube (CRT) display, mainly in portable machines and equipment. Along with the recent expansion of the functions of personal computers and word processors and with the recent increase in the capacity of data processing, LCD is also required to have higher functions, that is, to have functions such as a large display capacity, a full-color display, a wide viewing angle, a high-speed response and a high contrast.

As a liquid crystal display method (liquid crystal driving method) to comply with such requirements, an active matrix (AM) display device has been proposed and, to some extent, is practically used. In the AM display device, thin film transistors (TFT) or diodes (MIM) are formed such that each element is constituted of one transistor or diode and one pixel on a display screen and a liquid crystal is driven for one pixel independently of another.

The above display method has had problems that decreasing a cost is difficult due to a low production yield and that forming a large-sized display screen is difficult. However, the problems are being overcome little by little, and the above display method is about to surpass a conventional mainstream STN display method and is about to overtake CRT due to its high display quality.

However, the above AM display device has the following problems due to the use of a TN (twisted nematic) liquid crystal as a liquid crystal material.

(1) A TN liquid crystal is a nematic liquid crystal, and the response speed is generally low (several tens ms), so that no good image quality can be obtained in the display of video frames.

(2) A twisted state (twist alignment) of liquid crystal molecules is used for displaying, and the viewing angle is therefore narrow. In displaying with a gray scale in particular, the viewing angle becomes sharply narrowed. That is, the contrast ratio, the color or the like changes depending upon viewing angles to a display screen.

For overcoming the above problems, there have been, in recent years, proposed AM panels which use a ferroelectric liquid crystal or an anti-ferroelectric liquid crystal in place of the TN liquid crystal (Japanese Laid-open Patent Publications Nos. 5-249502, 5-150257 and 6-95080). At present, however, the following problems remain to solve for the practical use of these liquid crystals.

(A) A ferroelectric liquid crystal has spontaneous polarization. An image sticking is liable to occur due to constant presence of the spontaneous polarization.

In displaying in a surface stabilization mode with a ferroelectric liquid crystal, it is very difficult to perform a gray-scale display since only a binary display of black and white is possible in principle. For the gray-scale display, a special artifice is required (for example, use of a ferroelectric liquid crystal device using monostability; Keiichi NITO et al., SID '94, Preprint, p. 48), and it is required to develop a high technique for practical use.

(B) An anti-ferroelectric liquid crystal is free from the image sticking problem described in the above (A) since it has no spontaneous polarization.

In the AM driving, there is at least needed a liquid crystal material which can be driven at 10 V or lower. However, the anti-ferroelectric liquid crystal generally shows a high threshold voltage, and its driving at a low voltage is therefore difficult. Further, it has another problem that the gray-scale display is difficult to perform since its optical response involves a hysteresis.

PROBLEMS TO BE SOLVED BY THE INVENTION

In recent years, the present inventors have found a liquid crystal material which can highly possibly overcome the above problems (Japanese Laid-open Patent Publication No. 8-337555). The above material can be driven at a voltage of 10 V or lower and is free of a hysteresis in optical response. In optical response to a charged voltage, the above material exhibits an optical response which is symmetrical in a positive voltage region and a negative voltage region and which involves a small hysteresis or is free of hysteresis, so that the above material is optimum for active matrix driving.

However, active-matrix-driving experimental liquid crystal display devices prepared from the above material have a problem that even a device which has an excellent initial alignment state and gives a high image quality comes to show a deterioration in image quality with the passage of time.

The present inventors have made further studies for overcoming the above problem.

Generally, in measurement of a liquid crystal for physical properties, a test cell in which the liquid crystal is injected is used, the liquid crystal is measured for a series of properties by applying an AC voltage, such as an optical response by applying a triangular wave voltage, and the liquid crystal is finally measured for a tilt angle by applying an DC voltage. The test cell used for the above measurements of physical properties are stored under predetermined conditions for a predetermined period of time, and then disposed of.

In the above measurements using the test cell, the measurements take approximately several hours, and in such a case, there is caused no special problem.

When data obtained by the above measurements were analyzed, data of some test cells involve some questions. These test cells were therefore again used for the measurements. However, the liquid crystals of the test cells changed in alignment state to a great extent, and no general physical property data could be obtained. That is, they were not measurable for physical properties.

The present inventors have therefore made further studies for causes thereof.

First, the present inventors have made studies for a method to restore the alignment state of liquid crystals of the stored test cells. However, the restoration has not at all been possible when general means such as application of a voltage are employed. Therefore, the liquid crystals have been again melted and treated for re-alignment, while it has been impossible to completely reproduce the initial measurement data.

Further, behaviors of a change in alignment state have been studied.

First, it has been found that when the test cells are allowed to stand after the measurement of physical properties made by applying AC voltage, the alignment state changes. When the test cells are allowed to stand without connecting electrodes on both surfaces of each test cell, there are caused some differences in the rate of a change in alignment state or the behavior of the change in alignment state among the test cells for a time period practical for the test method. That is, it has been found that the reproductivity thereof is insufficient. Further, when the test cells are stored for a long period of time, there is found no differences in change in alignment among the test cells. In contrast, when the test cells were allowed to stand in a state where electrodes on both surfaces of each test cell are connected to each other, there is caused a moderate change in alignment state, and the reproductivity comes to be sufficient among the test cells. It has been found that an alignment change which the test cells shows after standing for a long period of time is similar to the result obtained when the test cells are allowed to stand for a long period of time without connecting the electrodes on both the surfaces.

On the basis of the above results, it has been assumed that these liquid crystal materials cause a large change in alignment state when only injected to test cells and allowed to stand, and that the above change shows a spontaneous shift toward a more stabilized state. As described already, further, the liquid crystal display device which has once had the above change cannot be completely restored to its original state even if it is heated to form a uniform phase (Iso) and treated for re-alignment.

Under the circumstances, it has been an essential object to discover a material which does not cause the above phenomenon.

It is an object of the present invention to provide a liquid crystal material which shows an optical response optimum for active matrix driving and which has excellent alignment stability without causing a change in alignment with the passage of time.

MEANS TO SOLVE THE PROBLEMS

According to the present invention, the above object of the present invention is achieved by a liquid crystal composition comprising anti-ferroelectric liquid crystal compound (1) selected from liquid crystal compounds of the following formula (1) and a ferrielectric liquid crystal compound (2) or a racemic compound (2') thereof, wherein the liquid crystal composition satisfies the following requirements (a) to (c), (a) the compositional ratio of the anti-ferroelectric liquid crystal compound (1) and the ferrielectric liquid crystal compound (2) or the racemic compound (2') thereof is in the range of from a value which is on the anti-ferroelectric phase side and is apart from a value of a boundary a compositional ratio by 5 mol % to a value which is on the ferrielectric phase side and is apart from the value of the boundary compositional ratio by 25 mol %, wherein the boundary compositional ratio is obtained on the basis of a liquid crystal phase diagram prepared on the basis of conoscopic image observations obtained by changing the mixing ratio of the anti-ferroelectric liquid crystal compound (1) and the ferrielectric liquid crystal compound (2) or the racemic compound (2') thereof, (b) in an optical response to an applied voltage, the liquid crystal composition exhibits an optical response which is symmetrical in a positive voltage region and a negative voltage region and which is free of hysteresis or involves a small hysteresis, and (c) the liquid crystal composition has excellent alignment stability, (1)

wherein $R^1$ is a linear alkyl group having 8 to 11 carbon atoms, $X^1$ is a hydrogen atom or a fluorine atom, A is —$CH_3$ or —$CF_3$, m is an integer of 1 or 3, n is an integer of 1 or 2, and C* is an asymmetric carbon atom.

BRIEF DESCRIPTION OF THE DRAWINGS

In FIGS. 1 to 3, symbols have the following meanings.
Iso: Isotropic phase
SA: smectic A phase
ferro: Ferroelectric phase
ferri: Ferrielectric phase
anti: Anti-ferroelectric phase The liquid crystal composition of the present invention will be explained with reference to drawings hereinafter.

Figure 1:
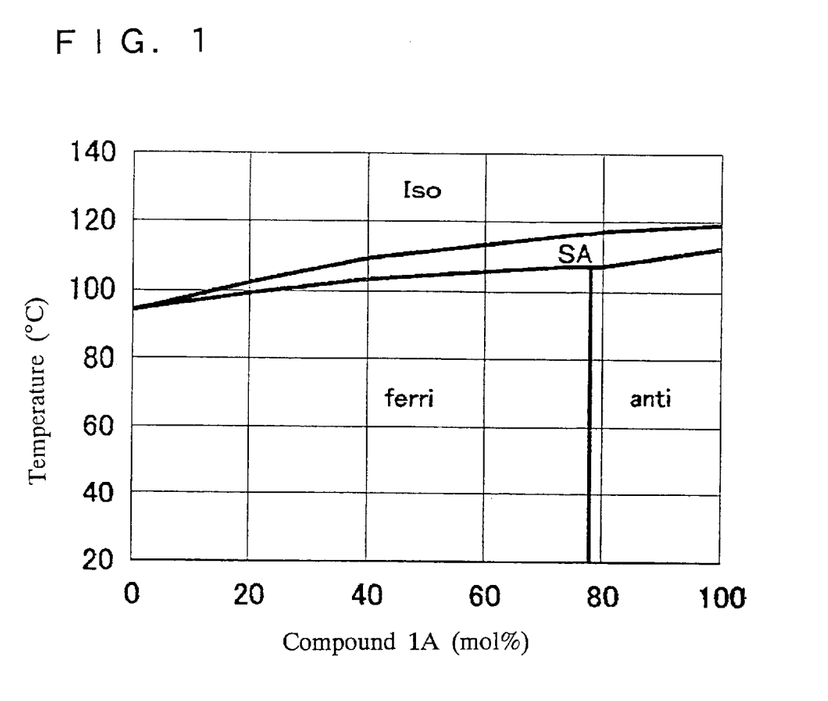
FIG. 1 is a liquid crystal phase diagram (binary phase diagram) prepared on the basis of conoscopic image observations of a liquid crystal composition in Example 1 of the present invention.
Figure 2:
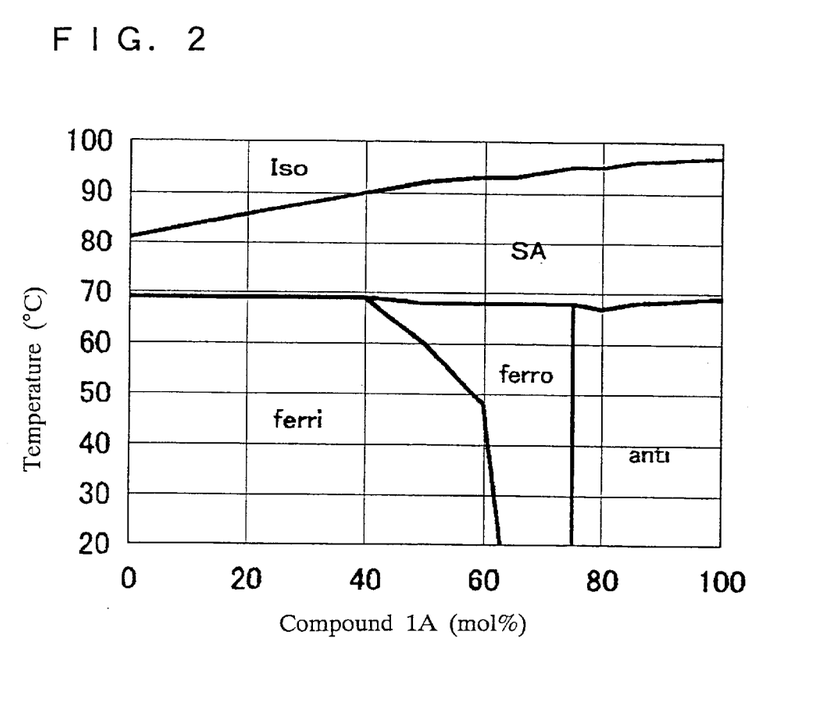
FIG. 2 is a liquid crystal phase diagram prepared on the basis of conoscopic image observations of a liquid crystal composition in Example 1 of the present invention in which the contents of two compounds for improving properties are fixed at 15 molt each (total 30 molt).
Figure 3:
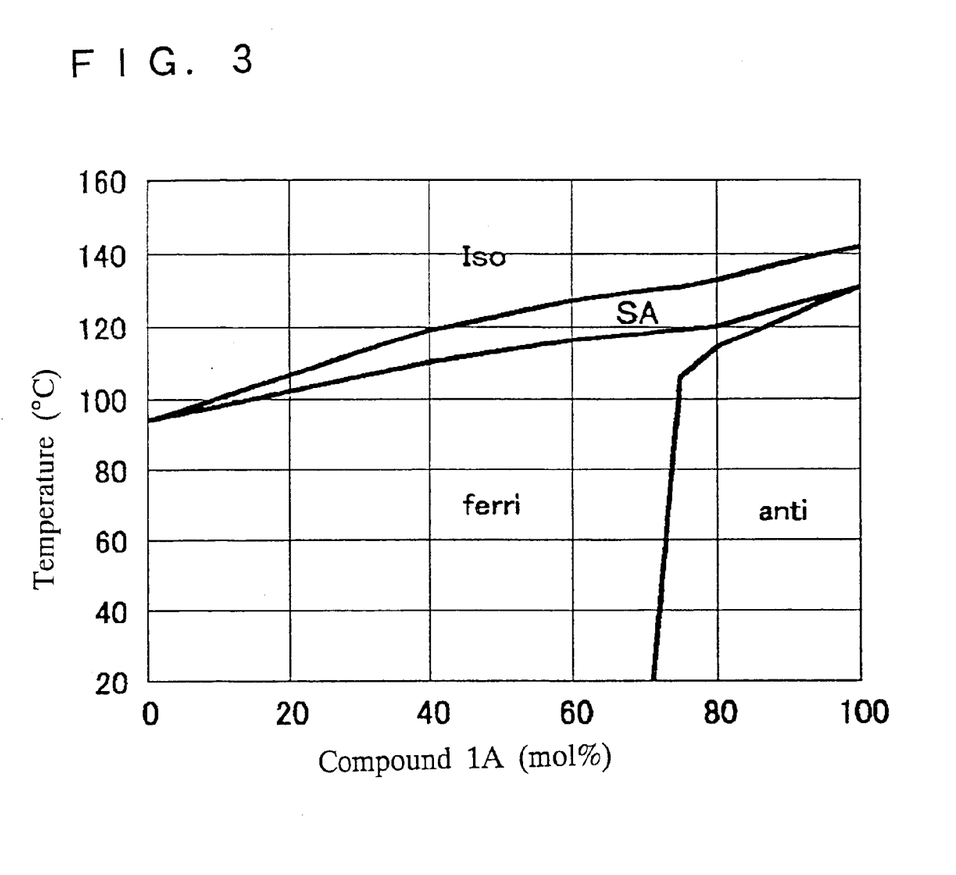
FIG. 3 is a liquid crystal phase diagram (binary phase diagram) prepared on the basis of conoscopic image observations of a base liquid crystal compound of a liquid crystal composition in Example 5 of the present invention.

FIGS. 1 to 3 are liquid crystal phase diagrams (phase diagrams) prepared on the basis of conoscopic image observations.

FIGS. 1 and 3 are liquid crystal phase diagrams prepared on the basis of conoscopic image observations of a composition containing a compound (1) and a compound (2) used in the present invention when the compositional ratio (mixture molar ratio) thereof are changed.

FIG. 2 is a liquid crystal phase diagram prepared on the basis of conoscopic image observations of a composition containing a modifier for improving physical properties of the formula (3) in addition to the liquid crystal compounds in FIG. 1 when the compositional ratio of the compounds (1) and (2) is changed.

FIG. 1 shows a phase diagram of a binary composition containing an anti-ferroelectric liquid crystal compound (1A) and a ferrielectric liquid crystal compound (2A) in Example 1. It is shown that the boundary compositional ratio (molar ratio) of the anti-ferroelectric phase (to be sometimes abbreviated as "anti phase" hereinafter) and the ferrielectric phase (to be sometimes abbreviated as "ferri phases" hereinafter) is 1A/2A=78/22. The term "boundary compositional ratio" is used to mean a compositional ratio at room temperature (25° C.) and will be used in this sense hereinafter. In the above binary composition, as will be clear in Example 1 to be described later, the compositional ratio in which the requirements (b) and (c) of the present invention are satisfied exists in a range of from the boundary compositional ratio (1A/2A=78/22) to a compositional ratio which is on the ferri phase side and is apart from the boundary compositional ratio by 25 mol % (i.e., compositional ratio (i.e., 1A/2A=53/47), more preferably by 15 mol % (i.e., 1A/2A=63/37). Further, the compositional ratio in which the requirements (b) and (c) of the present invention are satisfied exists in a range of from the boundary compositional ratio (1A/2A=78/22) to a compositional ratio which is on the anti phase side and is apart from the boundary compositional ratio by 5 mol % (i.e., compositional ratio (i.e., 1A/2A=83/17), preferably by 3 mol % (i.e., 1A/2A=81/19).

FIG. 3 shows a liquid crystal phase diagram of a liquid crystal composition containing, as an anti-ferroelectric liquid crystal compound (1), a compound (1C) in place of the compound (1A). The anti-ferroelectric liquid crystal compound (1C) in FIG. 3 is a compound showing strong anti-ferroelectricity and having an anti-ferroelectric phase (anti phase) in a very broad temperature range like the compound in FIG. 1. The boundary compositional ratio of the composition in FIG. 3 is 1C/2A=70/30. The boundary compositional ratio has a gradient, and in 1C/2A=80/20, a large difference from FIG. 1 is found in that a ferri phase is present on a high temperature side (approximately 110 to 120° C.) of the anti phase.

FIG. 2 shows a liquid crystal phase diagram prepared on the basis of conoscopic image observations of a composition obtained by incorporating 15 mol % of each of modifier for improving physical properties of the formula (3) in the present invention (total 30 mol %) to the composition in FIG. 1. In FIG. 2, the conoscopic image observations show that a ferroelectric phase (ferro phase) is present between an anti phase and a ferri phase.

The above ferro phase exhibits the properties which satisfy the above requirements (b) and (c) intended in the present invention.

In the above liquid crystal composition, further, an excellent dark state can be realized under an applied voltage of 0, and the molecular arrangement thereof is observed to be anti phase under an applied voltage of 0. The molecular arrangement has been identified according to the higher dielectric constant measurement of a liquid crystal (Ferroelectrics, vol. 147, pp. 411 (1993) ORIHARA et al., Journal of the Physical Society of Japan, vol. 64, No. 9, pp. 3188 (1995) OBAYASHI et al).

The ferro phase in FIG. 2 is a phase which is at any rate a conoscopic image observations and is in the range where the requirements (b) and (c) of the physical properties of the binary composition in FIG. 1 are satisfied, so that it is reasonable to consider that the above phase is a ferri phase intensely influenced by the anti-ferroelectric liquid crystal compound or an anti phase intensely influenced by the ferrielectric liquid crystal compound, and is not a ferro phase. Since an anti phase generally shows a high threshold voltage, it is seen that the molecular arrangement thereof is very stable. In the phase diagram, it is considered that the ferri phase close to the anti phase takes over the stability of the anti phase, so that the alignment stability during no voltage application is improved.

The above point appears to be also supported by a comparison of a composition of Example 6 with a binary composition which constitutes a base thereof. That is, in a composition which is the same as the composition in FIG. 1 except that the ferrielectric liquid crystal compound (2A) is replaced with a racemic compound (2B) thereof, a liquid crystal phase diagram nearly similar to the diagram shown in FIG. 1 is obtained. In the composition containing a third component in Example 6, when 1A/2B (racemic compound of 2A)=70/30, a phase sequence of I(96)SA(70)SX1*(42) SCA*(<−30) is observed. And, the SX1*(ferro) and SCA* (anti) are indistinguishable and continuous in a test cell as far as visual observation, V-letter-shaped optical response and others are concerned.

Further, the modifier for improving physical properties of the formula (3) is for improving the liquid crystal composition in physical properties, i.e., properties required in a practical temperature range in which a liquid crystal display device is used as such.

The essential effect of the above modifier is to make it possible to realize the following. The value of temperature axis of the phase diagram, such as the physical property values (optical response speed in particular) which the binary composition shows at a temperature between 80° C. and 70° C. can be realized at a room temperature between 25° C. and 15° C.

The modifier is preferably selected from those which do not degrade other properties at all if possible, and is more preferably selected from those which shows an effect on improvement of the long-term stability of V-letter-shaped response or the realization of an earlier restoration.

When a third component which is a modifier for improving physical properties is added, a liquid crystal phase diagram which changes to some extent is observed as shown in FIG. 2. It is preferred to select the third component from those which substantially do not alter the properties of a binary composition in elements other than the shift of the temperature axis thereof or which do not alter the above properties at all if possible.

In the present invention, the range of the amount ratio of the anti-ferroelectric liquid crystal compound (1) and the ferrielectric liquid crystal compound (2) or the racemic compound (2') thereof is specifically determined by the following procedures. First, the anti-ferroelectric liquid crystal compound (1) is selected from compounds of the above formula (1). That is, a compound well-balanced among various properties is selected as an anti-ferroelectric liquid crystal compound (1). It is particularly advantageous to use, as an anti-ferroelectric liquid crystal compound (1), a compound of the formula (1) in which $R^1$ is a linear alkyl group having 8 to 10 carbon atoms, $X^1$ is a fluorine atom, A is —$CH_3$ or —$CF_3$, m is 1 or 3, and n is 1 or 2.

The so-selected anti-ferroelectric liquid crystal compound (1) is mixed with a ferrielectric liquid crystal compound (2) in various mixing ratios, and a liquid crystal phase diagram is prepared by conoscopic image observations of compositions. The above ferrielectric liquid crystal compound (2) is selected from liquid crystal compounds well-balanced among various physical properties. The liquid crystal composition of the present invention is a composition containing the anti-ferroelectric liquid crystal compound (1) and the ferrielectric liquid crystal compound (2) in a specific range. The liquid crystal composition of the present invention can similarly achieve the object of the present invention even when the above ferrielectric liquid crystal compound (2) is replaced with a racemic compound (2') thereof.

As described above, a liquid crystal phase diagram is prepared by conoscopic image observations of mixtures having varied mixing ratios of the anti-ferroelectric liquid crystal compound (1) and the ferrielectric liquid crystal compound (2) or the racemic compound (2') thereof (the ferrielectric liquid crystal compound (2) or the racemic compound (2') thereof will be simply referred to as "ferrielectric liquid crystal compound (2 or 2')" hereinafter). On the basis of the above liquid crystal phase diagram, the boundary compositional ratio of the anti-ferroelectric phase and the ferrielectric phase is determined. For an easier understanding of the "boundary compositional ratio", it will be specifically explained with reference to FIG. 1.

FIG. 1 shows a liquid crystal phase diagram prepared on the basis of conoscopic image observations of compositions prepared by mixing the anti-ferroelectric liquid crystal compound (1A) and the ferrielectric liquid crystal compound (2A) used in Example 1 in various mixing ratios. FIG. 1 shows that a distinct boundary is present between an anti-ferroelectric phase (anti phase) and a ferrielectric phase (ferri phase) when the anti-ferroelectric liquid crystal compound/ferrielectric liquid crystal compound (1A/2A) molar ratio is 78/22 at a temperature lower than approximately 100° C. The above (1A/2A) ratio in the above distinct boundary is expressed in terms of a percentage, and the percentage is referred to as "boundary compositional ratio" in the present specification. The composition in FIG. 1 has a boundary compositional ratio of 78/22. The boundary compositional ratio varies depending upon a combination of the anti-ferroelectric liquid crystal compound (1) and the ferrielectric liquid crystal compound (2 or 2'), so that the liquid crystal phase diagram is prepared depending upon the composition of a combination of these two compounds and the boundary compositional ratio is determined.

Further, FIG. 2 shows a liquid crystal phase diagram of a composition prepared by incorporating the above modifier to the composition having the liquid crystal phase diagram shown in FIG. 1. In the liquid crystal phase diagram, a ferro phase is shown between the anti phase and the ferri phase as is described already. In the present invention, when a modifier is added to a composition, the boundary compositional ratio of the composition containing no modifier is used. Therefore, the range of the amount ratio of the anti-ferroelectric liquid crystal compound (1) and the ferrielectric liquid crystal compound (2 or 2') of the composition in FIG. 2 is determined on the basis of the above boundary compositional ratio of the composition in FIG. 1.

The boundary compositional ratio of a liquid crystal composition containing a certain combination of the above two compounds is determined as described above, and in the liquid crystal composition of the present invention, the range of the amount ratio of the anti-ferroelectric liquid crystal compound (1) and the ferrielectric liquid crystal compound (2 or 2') is determined on the basis of the above boundary compositional ratio. That is, when the boundary compositional ratio (mol %) of the anti-ferroelectric liquid crystal compound (1)/the ferrielectric liquid crystal compound (2 or 2') is W/(100−W), the range of the amount ratio of the anti-ferroelectric liquid crystal compound (1)/the ferrielectric liquid crystal compound (2 or 2') in the present invention is from (W−25)/(125−W) to (W+5)/(95−W).

In the liquid crystal composition of the present invention, the amount ratio of the anti-ferroelectric liquid crystal compound (1)/the ferrielectric liquid crystal compound (2 or 2') is preferably in the range of from (W−15)/(115−W) to (W+3)/(97−W).

The requirements (a) to (c) in the present invention will be explained hereinafter.

The liquid crystal composition of the present invention contains one or at least 2 anti-ferroelectric liquid crystal compounds selected from the liquid crystal compounds of the formula (1).

Various anti-ferroelectric liquid crystal compounds other than those of the formula (1) are also known, while it is preferred in the present invention to use compound(s) selected from the compounds of the formula (1) in view of stability of the anti-ferroelectric phase. The most preferred are those compounds which have (show) neither a ferrielectric phase (ferri phase) nor a ferroelectric phase (ferro phase) on the high-temperature side of the anti-ferroelectric phase (anti phase) in the phase sequence of the liquid crystal phase.

Specific examples of the anti-ferroelectric liquid crystal compound (1) are as follows.

$C_9H_{19}OPhPhCOOPh(F)COOC^*H(CH_3)CH_2CH(C_2H_5)_2$
I(122)SA(114)SCA*(7)SX(<−30)Cr $C_{11}H_{23}OPhPhCOOPh(F)COOC^*H(CH_3)CH_2CH(C_2H_5)_2$
I(113)SA(109)SC*(109)SCA*(−19)Cr $C_9H_{19}OPhPhCOOPh(F)COOC^*H(CH_3)CH_2CH(CH_3)_2$
I(142)SA(131)SCA*(18)Cr $C_9H_{19}OPhPhCOOPh(F)COOC^*H(CF_3)CH_2CH(C_2H_5)_2$
I(96)SC*(90)SCA*(55)Cr $C_9H_{19}OPhPhCOOPh(F)COOC^*H(CH_3)(CH_2)_3CH(CH_3)_2$
I(134)SA(125)SC*(122)SCA*(17)SX(−21)SY(<−30)Cr $C_9H_{19}OPhPhCOOPh(F)COOC^*H(CF_3)(CH_2)_3CH(C_2H_5)_2$
I(88)SCA*(<−30)Cr $C_9H_{19}OPhPhCOOPh(F)COOC^*H(CF_3)(CH_2)_3CH(CH_3)_2$
I(103)SC*(101)SCA*(26)Cr

In the liquid crystal composition of the present invention, a composition having an anti-ferroelectric liquid crystal compound (1)/ferrielectric liquid crystal compound (2 or 2') mixing ratio in a specific compositional ratio range (molar ratio) is prepared and used as a basic composition (binary composition or base composition), and to the composition is added a modifier (3) for improving the response speed of the above composition in a temperature range, generally a temperature range including room temperature, at which the composition is used as a liquid crystal display device. The so-obtained composition is practically used.

The ferrielectric liquid crystal compound (2) can be selected from various ferrielectric liquid crystal compounds and racemic compounds thereof since the limitation thereto in view of the requirements (b) and (c) is not so severe. From the above viewpoint, it is preferred to select a ferrielectric liquid crystal compound excellent in physical properties such as a tilt angle and the like.

Specifically preferred examples of the ferrielectric liquid crystal compound (2) will be explained below.

In one preferred example of the ferrielectric liquid crystal compound (2), preferably, the voltage at which the ferrielectric liquid crystal compound itself transits from the ferrielectric state to the ferroelectric state is 2.5 V/μm or less. In another preferred example of the ferrielectric liquid crystal compound (2), the transition temperature on the high temperature side of the ferrielectric phase in the ferrielectric liquid crystal compound itself is 80° C. or higher, and the transition temperature on the high temperature side of the ferrielectric phase and the transition temperature on the low temperature side of the ferrielectric phase differ from each other by at least 50° C.

The ferrielectric liquid crystal compound (2) or the racemic compound (2') thereof is particularly preferably selected from liquid crystal compounds of the following formulae (2-i) and (2-ii) or racemic compounds thereof.

(2-i)

wherein Q is a linear alkyl group having 8 to 12 carbon atoms, Y is a hydrogen atom or a fluorine atom, Z is —$CH_3$ or —$CF_3$, p is 1 or 2 and C* is an asymmetric carbon.

(2-ii)

wherein Q' is a linear alkyl group having 8 to 12 carbon atoms, Y' is a hydrogen atom or a fluorine atom, q is an integer of 2 to 4, r is an integer of 2 to 4 and C* is an asymmetric carbon.

Specific examples of the ferrielectric liquid crystal compound (2) are as follows. Further, racemic compounds of these can be also naturally used as compound (2') although not shown. Of these compounds, compounds ① to ⑪ are particularly preferred.

Compounds Included in the Compounds of the Formula (2-i)
① $C_9H_{19}$OPhPhCOOPh(F)COOC*H($CF_3$)($CH_2$)$_2$CH($C_2H_5$)$_2$I(95)SC$_\gamma$*(<-30)Cr
② $C_9H_{19}$OPhPhCOOPh(F)COOC*H($CF_3$)($CH_2$)$_2$CH($C_2H_5$)$_2$I(107)SA(102)SC$_\gamma$*(19)SX(<-30)Cr
③ $C_8H_{17}$OPhPhCOOPh(F)COOC*H($CF_3$)($CH_2$)$_2$CH($CH_3$)$_2$ I(121)SA(120)SC$_\gamma$*(65)SCA*(30)Cr
④ $C_9H_{19}$OPhPhCOOPh(F)COOC*H($CF_3$)($CH_2$)$_2$CH($CH_3$)$_2$I(114)SC$_\gamma$*(-6)SX(or Cr)

Compounds Included in the Compounds of the Formula (2-ii)
⑤ $C_8H_{17}$OPhPhCOOPh(F)COOC*H($CF_3$)($CH_2$)$_3$O$C_2H_5$I(107)SX(106.5)SC$_\alpha$*(104.8)SC$_\gamma$*(<-30)Cr
⑥ $C_9H_{19}$OPhPhCOOPh(F)COOC*H($CF_3$)($CH_2$)$_3$O$C_2H_5$I(103)SA(101.8)SC$_\gamma$*(<-30)Cr
⑦ $C_{10}H_{21}$OPhPhCOOPh(F)COOC$_\alpha$*H($CF_3$)($CH_2$)$_3$O$C_2H_5$I(99)SA(98.4)SC$_\gamma$*(-5.4)Cr
⑧ $C_8H_{17}$OPhPhCOOPh(F)COOC*H($CF_3$)($CH_2$)$_4$O$C_2H_5$I(95)SA(92)SC$_\gamma$*(<-30)Cr
⑨ $C_9H_{19}$OPhPhCOOPh(F)COOC*H($CF_3$)($CH_2$)$_4$O$C_2H_5$I(92)SA(90)SC$_\gamma$*(<-30)Cr
⑩ $C_{10}H_{21}$OPhPhCOOPh(F)COOC*H($CF_3$)($CH_2$)$_4$O$C_2H_5$I(85)SA(84)SC$_\gamma$*(<-30)Cr
⑪ $C_8H_{17}$OPhPhCOOPh(F)COOC*H($CF_3$)($CH_2$)$_2$O$C_2H_5$I(108)SC$_\alpha$*(103)SC$_\gamma$*(33)Cr As already explained, the compositional ratio of the above liquid crystal compounds (1) and (2) is selected so that it is in the range of from a value which is on the anti-ferroelectric phase side and is apart from the boundary compositional ratio between the ferrielectric phase and the anti-ferroelectric phase by 5 mol % to a value which is on the ferrlelectric phase side and is apart from the boundary compositional ratio by 25 mol %, in the liquid crystal phase diagram prepared on the basis of conoscopic image observations obtained by changing the mixing ratio of the above liquid crystal compounds (mixing ratio of binary composition). The above compositional ratio of the liquid crystal compounds (1) and (2) is more preferably selected so that it is in the range of from a value which is on the anti-ferroelectric phase side and is apart from the boundary compositional ratio by 3 molt to a value which is on the ferrielectric phase side and is apart from the boundary compositional ratio by 15 mol %.

Further, the composition having the above-selected specific compositional ratio is required to satisfy the requirements (b) and (c).

The requirement (b) is that the optical response to an applied voltage is symmetrical in a positive voltage region and a negative voltage region and is free of hysteresis or involves a small hysteresis (to be referred to as "V-letter-shaped optical response" hereinafter). The above optical response is a typical optical response which the ferrielectric liquid crystal compound (2) as one of the base components used in the present invention exhibits when injected in a test cell and measured for an optical response. When the above compound (2) is used as a main component of the base components, the stability thereof is poor as is already described.

The so-called "V-letter-shaped optical response" is a property suitable for the production of AM devices such as TFT. The hysteresis varies depending upon the type of an alignment film used in a liquid crystal device and its surface treatment. Preferably, the hysteresis is substantially absent, and specifically, the hysteresis in terms of a voltage difference is 15% or less based on a saturated voltage value, preferably 10% or less, particularly preferably 5% or less.

The requirement (c) is a requirement for overcoming the essential problem in the present invention.

A liquid crystal cell is generally prepared by heating a liquid crystal up to a temperature at which the liquid crystal compound has an isotropic phase, injecting the liquid crystal compound to a cell, and decreasing the temperature so as to bring the liquid crystal into a predetermined alignment state.

The evaluation of the alignment stability refers to the evaluation of stability of the above "predetermined alignment state" and maintenance capability of minimum value of an optical transmission during the applied voltage of 0.

When the above "predetermined alignment state" is an intermediate state toward a more stabilized liquid crystal phase or aggregation formation, shifting is to proceed spontaneously or with some moment.

Further, the requirement (c) is a requirement which determines excellence of the alignment stability, i.e., the property of long-term maintenance capability of a black level and prevention of degradation of an image quality.

In the evaluation of alignment stability in the present invention, a test cell is measured for an optical response to a triangular voltage of ±10V and 50 mHz at room temperature, the maximum value of optical transmission thereof is defined to be 100%, the minimum value of the optical transmission by the measurement is taken as Ti (%), then, the test cell is allowed to stand for 1 hour in a state where electrodes on the upper and lower surfaces of the test cell are connected, the test cell is similarly measured for an optical transmission, and the minimum value of the optical transmission is taken as Te (%). The alignment stability in the present invention is quantitatively evaluated as a value of (Te−Ti). It is preferred that the above value is smaller, and specifically, for a practical device, it is preferred that the value of (Te−Ti) is 0.4% or less.

In addition to the essential requirements (a), (b) and (c) of the liquid crystal composition of the present invention, when used in a practical device, the liquid crystal compound of the present invention may contain a selected modifier for improving physical properties for preventing the deterioration of a particularly required property or improving a particularly required property.

The modifier for improving physical properties used in the present invention is mainly intended for improving physical properties typified by a response speed at a low temperature, and a compound having a lower molecular weight is therefore preferred. On the other hand, it is essential to select a compound which substantially does not evaporate under conditions of injecting the liquid crystal into a liquid crystal cell. The amount of the above modifier is 50 mol % or less, preferably 40 mol % or less, per 100 mol % of the composition containing the modifier.

In the present invention, the above modifier is preferably selected from aromatic esters of the following formula (3), $$R^3\text{—E—(Ph—COO—)}_p\text{—B—COO—}R^4 \quad (3)$$

wherein each of $R^3$ and $R^4$ is independently selected from trifluoromethyl group, an alkyl group having 1 to 13 carbon atoms or a trifluoromethyl-substituted alkyl group having 1 to 13 carbon atoms such that $R^3$ and $R^4$ have at least 8 carbon atoms as a total, E is —O— or —COO—, Ph is a 1,4-phenylene group and p is 0 or 1, provided that when p is 0, B is a 1,4-phenylene, 2,6-naphthalene or 4,4'-biphenylene group on which fluorine may be substituted respectively, or that when p is 1, B is a 1,4-phenylene group on which fluorine may be substituted.

Typical examples of the above group $R^3$—E— include $CF_3O$—, $C_3H_7COO$—, $C_7H_{15}COO$ and $C_9H_{19}COO$. Typical examples of the above $R^4$ is —$CH_2CF_3$, —$(CH_2)_2CH(CH_3)_2$, —$C^*H(CH_3)C_6H_{13}$, —$C^*H(CH_3)C_5H_{11}$, —$C_9H_{19}$ and —$C_8H_{17}$.

Specific example of the above modifier are as follows:
$CF_3OPhCOOPhCOOC_8H_{17}$
$CF_3OPhCOOPh(F)COOC_8H_{17}$
$CF_3OPhCOOPh(F)COOC_{10}H_{21}$
$CF_3OPhCOOPhCOOCH_2Cy$ (where Cy means cyclohexyl)
$C_9H_{19}COONpCOOCH_2CF_3$ (where Np means 2,6-naphthalene)
$C_9H_{19}COOPhPhCOOCH_2CF_3$
$C_9H_{19}COOPhCOOPh(F)COOCH_2CF_3$
$C_9H_{19}OPhCOOPhCOOCH_2CF_3$
$C_9H_{19}COOPhCOOCH_2CF_3$
$C_9H_{19}COOPh(F)COOCH_2CF_3$
$C_{10}H_{21}COOPhCOOCH_2CF_3$
$C_9H_{19}OPhCOOCH_2CF_3$
$C_2H_5COOPhCOOPh(F)COOC^*H(CH_3)C_6H_{13}$
$C_3H_7COOPhCOOPh(F)COOC^*H(CH_3)C_5H_{11}$
$C_3H_7COOPhCOOPh(F)COOC^*H(CH_3)C_6H_{13}$
$C_3H_7COOPhCOOPh(F)COOC^*H(CH_3)C_7H_5$
$C_4H_9COOPhCOOPh(F)COOC^*H(CH_3)C_6H_3$
$C_3H_7OPhCOOPhCOOC^*H(CH_3)C_7H_{15}$
$C_7H_{15}COOPh(F)COOC_9H_{19}$
$C_7H_{15}COOPh(F)COOC_5H_{11}$
$C_9H_{19}COOPh(F)COOC_7H_{15}$
$C_9H_{19}COOPh(F)COOC_9H_{19}$
$C_9H_{19}COOPhCOOC_9H_{19}$
$C_9H_{19}COOPh(F)COOC_{11}H_{23}$
$C_{10}H_{21}COOPh(F)COOC_7H_{15}$
$C_{10}H_{21}COOPh(F)COOC_3H_7$
$C_9H_{19}COOPhCOOPh(F)COO(CH_2)_2CH(CH_3)_2$
$C_9H_{19}COOPh(F)COOPhCOO(CH_2)_2CH(CH_3)_2$ The modifier is selected such that the composition satisfies the above requirements (a), (b) and (c) and further retains or improves other physical properties particularly required when used in a practical device.

The above "other physical properties" (d) to be evaluated include sticking and a response speed at a low temperature. It is also preferred to quantitatively evaluate these as required.

For example, the sticking (d-1) is quantitatively evaluated by the following method.

At room temperature, triangular voltage of ±10 V and 1 Hz is applied to a test cell for 5 minutes, then, the test cell is measured for an optical response at an applied voltage of 50 mHz, the maximum value of optical transmission is defined to be 100%, the optical transmission when the voltage is switched off is taken as Tidc (%) (when this value is 0.4 or smaller, 0.4 is used), a DC voltage having a value which is ½ of a saturated voltage value obtained by the above measurement is applied to the test cell for 1 hour, and the optical transmission when the voltage is switched off is taken as Tdc (%). A value defined by the following equation is defined to be "sticking". This value is preferably 15% or less, more preferably 10% or less, when the composition is used in a practical device.

Sticking degree (%)=(Tdc−Tidc)×100/Tidc(%)

The liquid crystal composition of the present invention can give an active matrix liquid crystal display device by interposing it between substrates on which non-linear active devices such as thin film transistors or diodes are provided for individual pixels.

The anti-ferroelectric liquid crystal compounds (1) of the formula (1) and the ferrlelectric liquid crystal compound (2) used in the present invention can be easily produced, for example, by the following method.

For example, the method of the production of a compound of the formula (1) in which $R_1=C_9H_{19}$, m=1, n=2, $X^1$=F and A=—$CH_3$ is outlined as follows.

(1) $C_9H_{19}Br+HOPhPhCOOH \rightarrow C_9H_{19}OPhPhCOOH$
(2) (1)+$(SOCl_2) \rightarrow C_9H_{19}OPhPhCOCl$
(3) $CH_3COOPh(F)COOH+(SOCl_2) \rightarrow CH_3COOPh(F)COCl$
(4) (3)+$CH_3C^*H(OH)CH_2CH(C_2H_5)_2 \rightarrow CH_3COOPh(F)COOC^*H(CH_3)CH_2CH(C_2H_5)_2$
(5) (4)+$(PhCH_2NH_2) \rightarrow HOPh(F)COOC^*H(CH_3)CH_2CH(C_2H_5)_2$
(6) (2)+(5)→end product In the above reaction scheme, Ph is a 1,4-phenylene group, Ph(F) is a 1,4-phenylene group on the 3-position of which fluorine is substituted, and C* is an asymmetric carbon.

The above production process will be briefly explained below.

(1) shows a reaction between n-brominated nonyl and 4-(4'-hydroxy)biphenylcarboxylic acid.
(2) shows the chlorination of 4-(4'-nonyloxy) biphenylcarboxylic acid (1).

(3) shows the chlorination of 4-acetoxy-2-fluorobenzoic acid.

(4) shows a reaction between a chloride (3) and optically active 4-ethyl-2-hexanol.

(5) shows the deacetylation of acetyl group of an ester compound (4).

(6) shows the production of an end product by a reaction between a chlorinated compound (2) and a phenol compound (5).

The compounds of the formula (3) in the present invention can be easily produced, for example, by the following method. The production of a compound of the formula (3) in which $R^3=C_3H_7$, E=—COO—, p=1, B=Ph and $R^4$=HOC*H$(CH_3)C_6H_{13}$ is outlined as follows.

(1) $C_3H_7COOPhCOOH+(SOCl_2)\rightarrow C_3H_7COOPhCOCl$ (2) $CH_3COOPhCOOH+(SOCl_2)\rightarrow CH_3COOPhCOCl$ (3) $(2)+CH_3C*H(OH)C_6H_{13}\rightarrow CH_3COOPhCOOC*H(CH_3)C_6H_{13}$ (4) $(3)+(PhCH_2NH_2)\rightarrow HOPhCOOC*H(CH_3)C_6H_{13}$ (5) (1)+(4)→end product In the above reaction scheme, Ph is a 1,4-phenylene group.

(1) shows the chlorination of p-butanoxybenzoic acid.

(2) shows the chlorination of p-acetoxybenzoic acid.

(3) shows a reaction between a chlorinated compound (2) and optically active R-(-)-1-methyl-heptanol.

(4) shows the deacetylation of acetyl group of an ester compound (3).

(5) shows the production of an end product by a reaction between a chlorinated compound (1) and a phenol compound (4).

The present invention provides a novel liquid crystal composition. The novel liquid crystal composition of the present invention causes almost no sticking, exhibits excellent alignment and alignment stability and shows a V-letter-shaped optical response to an applied voltage. Therefore, the liquid crystal compound of the present invention can give high qualities display and a highly reliable active matrix liquid crystal display device.

EXAMPLES

The present invention will be more specifically explained with reference to Examples and Comparative Examples hereinafter, while the present invention shall not be limited thereto.

Compounds used in Examples and Comparative Examples, and phase sequences and other physical properties of liquid crystal phases of liquid crystal compositions were measured as follows.

(1) Identification of Liquid Crystal Phase

A liquid crystal phase was identified by texture observation, conoscopic image observations and DSC (differential scanning calorimeter) measurement and behavior of optical response. The conoscopic image is effective means for identifying a liquid crystal phase. The conoscopic image observations were conducted according to a literature (J. Appl. Phys. 31, 793 (1992)). A cell gap was set at 150 μm, and a liquid crystal phase to be observed was in a bulk state.

(2) Electrooptical Properties

Preparation of test cell:

A pair of glass substrates with insulating film ($SiO_2$, film thickness; 50 nm) and ITO electrodes were coated with polyimide (film thickness, about 80 nm), and one of a pair of the glass substrates was rubbed. A pair of the glass substrates were attached to each other through a spacer having a particle diameter of 1.6 μm to form a test cell. The cell had a thickness of 1.7 μm.

A composition was heated until the liquid crystals showed an isotropic phase, and then the composition was injected into the test cell by capillarity. Then, the test cell was gradually cooled at a rate of 1° C./minute to align the liquid crystals in parallel.

Generally, physical property values obtained by measurement vary within certain ranges depending upon test cells used, i.e., insulation films, alignment films and treatment methods with regard to the test cells and further depending upon. when the test cells were produced among the same materials.

Concerning the optical transmission, the optical transmission when light is completely shut off is taken as 0%.

The above test cell was temperature-decreased at a rate of 1.5° C./minute, and at room temperature (25° C.), the test cell was inserted between polarizing plates positioned at right angles to each other and measured for an optical response to a triangular voltage of ±10 V and 50 mHz. The maximum value of optical transmission obtained by the measurement was defined to be 100%.

(3) Phase Transition Voltage

On the basis of measurement of an optical response to a triangular voltage of ±10 V and 50 mHz at room temperature (25° C.), a voltage at 90% of optical transmission when transition to the ferroelectric phase took place (phase transition voltage) was determined.

(4) Alignment Stability

At room temperature (25° C.), a test cell was measured for an optical response to a triangular voltage of ±10V and 50 mHz, the minimum value of the optical transmission obtained by the measurement was taken as Ti(%), then, the test cell was allowed to stand for 1 hour in a state where electrodes formed on the upper and lower surfaces of the test cell were connected to each other, then, the test cell was similarly measured for an optical transmission, and the minimum value of the optical transmission obtained by the measurement was taken as Te(%). A difference of (Te−Ti) was used as an index for alignment stability. This difference shows that the smaller is the value thereof, the more excellent in alignment stability is a liquid crystal.

(5) Sticking Degree

At room temperature (25° C.), a triangular voltage of ±10V and 1 Hz was applied to a test cell for 5 minutes, then, the frequency of the applied voltage was changed to 50 mHz, the test cell was measured for an optical response, the maximum value of the optical transmission obtained by the measurement was defined to be 100%, the optical transmission when the voltage was switched off was taken as Tidc (%) (when this value was 0.4 or smaller, 0.4 was used), a DC voltage having a value which was ½ of a saturated voltage value obtained by the above measurement was applied to the test cell for 1 hour, and the optical transmission when the voltage was switched off was taken as Tdc (%). A value defined by the following equation was used as an evaluation standard for the sticking degree.

$$\text{Sticking degree } (\%)=(Tdc-Tidc)\times 100/Tidc(\%)$$

Example 1

An anti-ferroelectric liquid crystal compound (1A) of the following formula and a ferrielectric liquid crystal compound (2A) of the following formula were used, and conoscopic image observations were carried out with changing the compositional ratio of these compounds. FIG. 1 shows the results.

1A: R(−)—$C_9H_{19}$OPhPhCOOPh(3F)COOC*H($CH_3$)$CH_2CH(C_2H_5)_2$ (1A)

2A: R(+)—$C_9H_{19}$OPhPhCOOPh(3F)COOC*H($CF_3$)($CH_2$)$_2$CH($C_2H_5$)$_2$ (2A)

In the above formulae, Ph is a 1,4-phenylene group, Ph(3F) is a 1,4-phenylene group in which fluorine is substituted in the 3-position from a phenolic hydroxyl residue, and C* is an asymmetric carbon atom.

Further, Table 1 shows results of measurements of physical properties when the 1A/2A compositional ratio (molar ratio) was varied.

In the liquid crystal phase diagram prepared on the basis of conoscopic image observations, the boundary compositional ratio (1A/2A) between the ferrielectric phase and the anti-ferroelectric phase was 78/22.

When the composition has a compositional ratio which is on the anti-ferroelectric phase side and close to the above boundary compositional ratio, the composition shows an optical response having a hysteresis characteristic of the anti-ferroelectric phase.

In contrast, when composition has a compositional ratio which is on the ferrielectric phase side and close to the above boundary compositional ratio, the composition shows a V-letter-shaped optical response and has excellent alignment stability. However, it is seen that when the compositional ratio deviates from the above compositional ratio range to a great extent, the composition shows a ferrielectric phase inferior in alignment stability.

TABLE 1

| | Molar ratio 1A/2A | Phase sequence | Transition voltage (V) | Optical transmission (%) | | |
|---|---|---|---|---|---|---|
| | | | | Initial | after 1 hour | Difference |
| 1 | 100/0 | I(122)SA(114)SCA*(7)SX(<0)Cr | — | — | — | — |
| 2 | 83/17 | I(118)SA(109)SCA*(2)SX(<−20)Cr | — | — | — | — |
| 3 | 75/25 | I(116)SA(108)SC$_γ$*(<−30)Cr | 4.3 | 1.5 | 1.2 | −0.3 |
| 4 | 70/30 | I(115)SA(107)SC$_γ$*(<−30)Cr | 4.6 | 1.9 | 1.9 | 0 |
| 5 | 55/45 | I(112)SA(106)SC$_γ$*(<−30)Cr | 4.4 | 2.2 | 2.1 | −0.1 |
| 6 | 40/60 | I(109)SA(104)SC$_γ$*(<−30)Cr | 4.8 | 1.5 | 2.0 | 0.5 |
| 7 | 20/80 | I(102)SA(99)SC$_γ$*(<−30)Cr | 4.5 | 4.0 | 5.1 | 1.1 |
| 8 | 0/100 | I(94)SC$_γ$*(<−30)Cr | 4.2 | 4.7 | 4.7 | (1*) |

In the above phase sequences, parenthesized value shows a phase transition temperature (°C.), I shows an isotropic phase, SA shows a smectic A phase, SC$_γ$* shows a ferrielectric phase, SCA* shows an anti-ferroelectric phase, and Cr shows a crystal phase. Further, (*1) in the column of "Difference" of "Optical transmission" means that no good alignment state was obtained since liquid crystal molecules near upper and lower substrates were brought into a so-called twisted alignment state where the molecules were aligned in a mutually twisted state.

Examples 2 and 3

A liquid crystal composition was prepared by mixing the following compounds (3A) and (3B) as modifier for improving physical properties with the same liquid crystal compounds (1A and 2A) as those used in Example 1 in a 1A/2A/3A/3B molar ratio of 52.5/17.5/15/15 (molar ratio 1A/2A=75/25) or 56/14/15/15 (molar ratio 1A/2A=80/20). The composition was tested. Table 2 shows the results.

3A: $CF_3$OPhCOOPhCOOC$_8H_{17}$
3B: $C_9H_{19}$COOPhCOOCH$_2$CF$_3$

Examples 4 and 5

In Example 1, the anti-ferroelectric liquid crystal compound (1A) was replaced with the following anti-ferroelectric liquid crystal compound (1B or 1C), and a composition was prepared by mixing the compounds 1B, 2A, 3A and 3B in a 1B/2A/3A/3B molar ratio of 52.5/17.5/15/15 (molar ratio 1B/2A=75/25) (Example 4) or by mixing the compounds 1C, 2A, 3A and 3B in a 1C/2A/3A/3B molar ratio of 45.5/24.5/15/15 (molar ratio 1C/2A=65/35) (Example 5). The composition was tested. Table 2 shows the results.

1B: R(+)—$C_9H_{19}$OPhPhCOOPh(3F)COOC*H($CF_3$)($CH_2$)$_3$CH($CH_3$)$_2$ (1B)

1C: R(−)—$C_9H_{19}$OPhPhCOOPh(3F)COOC*H($CH_3$)$CH_2$CH($CH_3$)$_2$ (1C)

FIG. 3 shows a liquid crystal phase diagram prepared on the basis of conoscopic image observations of a binary composition of 1C/2A.

TABLE 2

| | Phase sequence | AA | Optical transmission (%) | | | BB | CC |
|---|---|---|---|---|---|---|---|
| | | | Initial | after 1 hour | Difference | | |
| Ex. 2 | I(92)SA(63)SX1*(<−30)Cr | 2.7 | 2.9 | 3.0 | 0.1 | 6.6 | 0.28 |
| Ex. 3 | I(94)SA(66)SX1*(<−30)Cr | 3.1 | 4.0 | 3.8 | −0.2 | 7.0 | 0.30 |
| Ex. 4 | I(79)SA(64)SX1*(<−30)Cr | 3.0 | 4.0 | 4.1 | 0.1 | — | — |
| Ex. 5 | I(97)SA(57)SX1*(<−30)Cr | 2.2 | 3.3 | 3.3 | 0.0 | 10.0 | 0.35 |
| 1B | I(103)SC*(101)SCA*(26)Cr | | | | | | |
| 1C | I(142)SA(131)SCA*(18)SX(−18)Cr | | | | | | |

Ex. = Example, AA = Transition voltage (V), BB = Sticking degree (%), CC = Helical pitch (μm)

In the above phase sequences, parenthesized value shows a phase transition temperature (°C.), I shows an isotropic phase, SA shows a smectic A phase, SX1* shows a ferroelectric phase in a conoscopic image observations, SCA* shows an anti-ferroelectric phase, SX shows an unidentified liquid crystal phase, and Cr shows a crystal phase. In the test cells used in these Examples, SX1* showed a V-letter-shaped optical response.

Examples 6 and 7

In Example 1, the ferrielectric liquid crystal compound (2A) was replaced with a racemic compound (2B) thereof, the following compound (3C) was used as a modifier for improving physical properties, and a composition was prepared from the compounds (1A), (2B), (3B) and (3C) by mixing them in the following compositional ratio. Further, the ferrielectric liquid crystal compound (2A) was replaced with the following ferrielectric liquid crystal compound (2C), and a composition was prepared from the compound (1A) and (2C) and the following compounds (3D) and (3F) by mixing them in the following compositional ratio.

Example 6: 1A/2B/3B3C=42/18/10/30 (molar ratio 1A/2B=70/30)

Example 7: 1A/2C/3D/3F=49/21/15/15 (molar ratio 1A/2C=70/30)

2C: R(+)—$C_9H_{19}$OPhPhCOOPh(3F)COOC*H($CF_3$)($CH_2$)$_3$O$C_2H_5$
3C: $C_9H_{19}$COOPhCOOPh(3F)COOC($CH_2$)$_2$CH($CH_3$)$_2$
3D: R(-)—$C_3H_7$COOPhCOOPh(3F)COOC*H($CH_3$)$C_6H_{13}$
3F: $C_9H_{19}$COONpCOOC$H_2$$CF_3$

TABLE 3

| Phase sequence | AA | Optical transmission (%) | | | BB |
|---|---|---|---|---|---|
| | | Initial | after 1 hour | Difference | |
| Ex. 6 | I(96)SA(70)SX1* (41)SCA*(<-30)Cr | 3.0 | 1.0 | 1.0 | 0 | 38 |
| Ex. 7 | I(92)SA(70)SX1* (<-30)Cr | 6.7 | 1.0 | 1.2 | 0.2 | — |
| 2C | I(103)SA(102)SC$_\gamma$* (<-20)Cr | — | | | | — |

Ex. = Example, AA = Transition voltage (V), BB = Spontaneous polarization nC/cm$^2$ In the above phase sequences, parenthesized value shows a phase transition temperature (°C.), I shows an isotropic phase, SA shows a smectic A phase, SX1* shows a ferroelectric phase in conoscopic image observations, SCA* shows an anti-ferroelectric phase, SC$_\gamma$* shows a ferrielectric phase, and Cr shows a crystal phase. In the test cells used in these Examples, SX1* shows a V-letter-shaped optical response.

The liquid crystal composition in Example 6 contains the racemic compound (2B) of the ferrielectric liquid crystal compound (2A) in place of the ferrielectric liquid crystal compound (2A), while the liquid crystal diagram of the binary composition is substantially not different from the liquid crystal diagram shown in FIG. 1.

In Example 6, a compound having SCA* (anti phase) was found in SX1* (ferro phase) and on the low-temperature side thereof. Although the third component is different and the amount thereof is different, it is hard to think that an essential difference is caused in liquid crystal phase due to a difference in the third component from view of identity with other value of physical properties.

Examples 8 to 12

A distinct liquid crystal composition was prepared from the liquid crystal compounds (1A) and (2A) of Example 1 and the following compounds (3B) and (3D) to (3H) modifier for improving physical properties.
3B: $C_9H_{19}$COOPhCOOC$H_2$$CF_3$
3D: R(-)—$C_3H_7$COOPhCOOPh(3F)COOC*H($CH_3$)$C_6H_{13}$
3E: R(-)—$C_3H_7$COOPhCOOPh(3F)COOC*H($CH_3$)$C_5H_{11}$
3F: $C_9H_{19}$COONpCOOC$H_2$$CF_3$
3G: $C_9H_{19}$COOPhPhCOOC$H_2$$CF_3$
3H: $C_7H_{15}$COOPh(3F)COO$C_9H_9$ In the above formulae, Ph, Ph(3F) and C* have the same meanings as those in notes to the formulae 1A and 2A, and Np shows a 2,6-naphthalene group.

The above distinct composition had the following compositional ratios (molar ratios).
Example 8: 1A/2A/3B/3D=49/21/15/15 (molar ratio 1A/2A=70/30)
Example 9: 1A/2A/3B/3E=52.5/17.5/15/15 (molar ratio 1A/2A=75/25)
Example 10: 1A/2A/3D/3F=49/21115/15 (molar ratio 1A/2A=70/30)
Example 11: 1A/2A/3D/3G=45.5/19.5/17.5/17.5 (molar ratio 1A/2A=70/30)
Example 12: 1A/2A/3D/3H=49/21/15/15 (molar ratio 1A/2A=70/30)

Physical properties of the above-obtained liquid crystal compositions were tested, and Table 4 shows the results.

The liquid crystal composition prepared in Example 12 showed a response speed of 18 ms at -10° C. and was improved in low-temperature properties.

TABLE 4

| Phase sequence | AA | Optical transmission (%) | | | BB | CC |
|---|---|---|---|---|---|---|
| | | Initial | after 1 hour | Difference | | |
| Ex. 8 | I(91)SA(67)SX1* (<-30)Cr | 4.2 | 0 | 0 | 0 | 6.7 | 0.32 |
| Ex. 9 | I(95)SA(71)SX1* (<-30)Cr | 4.7 | 0.3 | 0 | -0.3 | 7.1 | 0.26 |
| Ex. 10 | I(95)SA(68)SX1* (<-30)Cr | 4.1 | 0.3 | 0.3 | 0 | 8.3 | 0.35 |
| Ex. 11 | I(103)SA(77)SX1* (<-30)Cr | 4.1 | 0 | 0 | 0 | 6.0 | 0.27 |
| Ex. 12 | I(97)SA(67)SX1* (<-30)Cr | 4.7 | 0.3 | 0.2 | -0.1 | 6.9 | 0.33 |

Ex. = Example, AA = Transition voltage (V), BB = Sticking degree (%), CC = Helical pitch (μm)

In Table 4, "0" in column of "optical transmission" means that it has a value of 0.04% or less.

In the above phase sequences, parenthesized value shows a phase transition temperature (°C.), I shows an isotropic phase, SA shows a smectic A phase, SX1* shows a ferroelectric phase in conoscopic image observations, and Cr shows a crystal phase. In the test cells used in these Examples, SX1* showed a V-letter-shaped optical response.

What is claimed is:

1. A liquid crystal composition comprising anti-ferroelectric liquid crystal compound (1) selected from liquid crystal compounds of the following formula (1) and a ferrielectric liquid crystal compound (2) or a racemic compound (2') thereof, wherein the liquid crystal composition satisfies the following requirements (a) to (c), (a) the compositional ratio of the anti-ferroelectric liquid crystal compound (1) and the ferrielectric liquid crystal compound (2) or the racemic compound (2') thereof is in the range of from a value which is on the anti-ferroelectric phase side and is apart from a value of a boundary compositional ratio by 5 mol % to a value which is on the ferrielectric phase side and is apart from the value of the boundary compositional ratio by 25 mol %, wherein the boundary compositional ratio is obtained on the basis of a liquid crystal phase diagram prepared on the basis of conoscopic image observations obtained by changing the mixing ratio of the anti-ferroelectric liquid crystal compound (1) and the ferrielectric liquid crystal compound (2) or the racemic compound (2') thereof, (b) in an optical response to an applied voltage, the liquid crystal composition exhibits an optical response which is symmetrical in a positive voltage region and a negative voltage region and an hysteresis, in terms of a voltage difference, of 15% or less, on a saturated voltage value, and (c) the alignment stability of the liquid crystal composition is such that when measured for an optical response by applying a triangular voltage of +10V and 50 mHz at room temperature, in a test cell having upper and lower surfaces with electrodes formed thereon, but not connected, the maximum value of optical transmission thereof being defined to be 100%, the minimum value of the optical transmission by the measurement is taken as Ti (%), and, when measured for an optical response under the same conditions after the test cell is allowed to stand for 1 hour in a state where said electrodes formed on the upper and lower surfaces of the test cell are connected, the minimum value of the optical transmission is taken as Te (%), then (Te−Ti) value is 0.4% or less, (I)

wherein $R^1$ is a linear alkyl group having 8 to 11 carbon atoms, $X^1$ is a hydrogen atom or a fluorine atom, A is —$CH_3$ or —$CF_3$, m is an integer of 1 or 3, n is an integer of 1 or 2, and C* is an asymmetric carbon atom.

2. The liquid crystal composition of claim 1, wherein (a) the compositional ratio of the anti-ferroelectric liquid crystal compound (1) and the ferrielectric liquid crystal compound (2) or the racemic compound (2') thereof is in the range of from a value which is on the anti-ferroelectric phase side and is apart from the boundary compositional ratio by 3 mol % to a value which is on the ferrielectric phase side and is apart the boundary compositional ratio by 15 mol %.

3. The liquid crystal composition of claim 1, which further contains a modifier for improving physical properties in a low-temperature region including room temperature.

4. The liquid crystal composition of claim 3, wherein the modifier is contained in an amount of 50 mol % or less per 100 mol % of the composition containing the modifier.

5. The liquid crystal composition of claim 3, wherein the modifier is at least one compound selected from aromatic esters of the formula (3),

(3)

wherein each of $R^3$ and $R^4$ is independently selected from trifluoromethyl, an alkyl group having 1 to 13 carbon atoms or a trifluoromethyl-substituted alkyl group having 1 to 13 carbon atoms such that $R^3$ and $R^4$ have at least 8 carbon atoms as a total, E is —O— or —COO—, Ph is a 1,4-phenylene group and p is 0 or 1, provided that when p is 0, B is a 1,4-phenylene, 2,6-naphthalene or 4,4'-biphenylene group on which fluorine may be substituted respectively, or that when p is 1, B is a 1,4-phenylene group on which fluorine may be substituted.

6. The liquid crystal composition of claim 1, wherein the ferrielectric liquid crystal compound (2) is a compound which transits from a ferrielectric state of the ferrielectric liquid crystal compound itself to a ferroelectric state at a voltage of 2.5 V/µm or less.

7. The liquid crystal composition of claim 1, wherein the ferrielectric liquid crystal compound (2) is a compound which causes a transition at a transition temperature of 80° C. or higher on a high temperature side of ferrielectric phase in the ferrielectric liquid crystal compound itself and shows a difference of at least 50° C. between the transition temperature on the high temperature side of the ferrielectric phase and a transition temperature on a low temperature side of the ferrielectric phase.

8. The liquid crystal composition of claim 1, wherein the ferrielectric liquid crystal compound (2) or the racemic compound (2') thereof is a ferrielectric liquid crystal compound selected from liquid crystal compounds of the formulae (2-i) and (2-ii) or a racemic compound thereof, (2-i)

wherein Q is a linear alkyl group having 8 to 12 carbon atoms, Y is a hydrogen atom or a fluorine atom, Z is —$CH_3$ or —$CF_3$, p is 1 or 2 and C* is an asymmetric carbon atom, (2-ii)

wherein Q' is a linear alkyl group having 8 to 12 carbon atoms, Y' is a hydrogen atom or a fluorine atom, q is an integer of 2 to 4, r is an integer of 2 to 4 and C* is an asymmetric carbon atom.

9. The liquid crystal composition of claim 8, wherein the ferrielectric liquid crystal compound (2) or the racemic compound (2') thereof is a ferrielectric liquid crystal compound selected from liquid crystal compounds of the formula (2-i) or a racemic compound thereof.

10. An active matrix liquid crystal display device in which the liquid crystal composition of claim 1 is interposed between substrates provided with thin film transistors or diodes for individual pixels.

11. The liquid crystal composition of claim 8, wherein in the anti-ferroelectric compound of formula (1), $R^1$ is a linear alkyl group having 8 to 10 carbon atoms, and $X^1$ is a fluorine atom.

12. The liquid crystal composition of claim 1, wherein the anti-ferroelectric liquid crystal compound (1) is at least one compound selected from the group consisting of
$C_9H_{19}OPhPhCOOPh(F)COOC*H(CH_3)CH_2CH(C_2H_5)_2$,
$C_{11}H_{23}OPhPhCOOPh(F)COOC*H(CH_3)CH_2CH(C_2H_5)_2$,
$C_9H_{19}OPhPhCOOPh(F)COOC*H(CH_3)CH_2CH(CH_3)_2$, $C_9H_{19}OPhPhCOOPh(F)COOC^*H(CF_3)CH_2CH(C_2H_5)_2$,
$C_9H_{19}OPhPhCOOPh(F)COOC^*H(CH_3)(CH_2)_3CH(CH_3)_2$,
$C_9H_{19}OPhPhCOOPh(F)COOC^*H(CF_3)(CH_2)_3CH(C_2H_5)_2$, and
$C_9H_{19}OPhPhCOOPh(F)COOC^*H(CF_3)(CH_2)CH(CH_3)_2$, wherein Ph represents phenyl.

13. The liquid crystal composition of claim 9, wherein the compound of formula (2-i) is selected from the group consisting of $C_9H_{19}OPhPhCOOPh(F)COOC^*H(CF_3)(CH_2)_2CH(C_2H_5)_2$,
$C_9H_{19}OPhPhCOOPhCOOC^*H(CF_3)(CH_2)_2CH(C_2H_5)_2$,
$C_8H_{17}OPhPhCOOPh(F)COOC^*H(CF_3)(CH_2)_2CH(CH_3)_2$, and
$C_9H_{19}OPhPhCOOPh(F)COOC^*H(CF_3)(CH_2)_2CH(CH_3)_2$, wherein Ph represents phenyl.

\* \* \* \* \*

UNITED STATES PATENT AND TRADEMARK OFFICE
CERTIFICATE OF CORRECTION

PATENT NO.    : 6,372,308 B1
DATED         : April 16, 2002
INVENTOR(S)   : Yoshioka, Johno, Yui and Matsumoto It is certified that error appears in the above-identified patent and that said Letters Patent is hereby corrected as shown below:

<u>Title page,</u>
Item [30], Foreign Application Priority Data, please change "Jan. 28, 1999 (JP) …… 11-213645" to -- Jul. 28, 1999 (JP) ….. 11-213645 --.

Signed and Sealed this

Twenty-fourth Day of September, 2002

Attest:

Attesting Officer

JAMES E. ROGAN
Director of the United States Patent and Trademark Office